US009628601B2

(12) United States Patent
Lee et al.

(10) Patent No.: US 9,628,601 B2
(45) Date of Patent: Apr. 18, 2017

(54) ELECTRONIC DEVICE AND METHOD OF CONTROLLING THE SAME

(71) Applicant: LG Electronics Inc., Seoul (KR)

(72) Inventors: Jieun Lee, Seoul (KR); Sungyoung Yoon, Seoul (KR); Sungjun Park, Seoul (KR); Minsoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 17 days.

(21) Appl. No.: 14/285,340

(22) Filed: May 22, 2014

(65) Prior Publication Data

US 2015/0011199 A1 Jan. 8, 2015

(30) Foreign Application Priority Data

Jul. 8, 2013 (KR) ........................ 10-2013-0079744

(51) Int. Cl.
*H04M 1/725* (2006.01)
*H04W 4/02* (2009.01)
*G06F 1/16* (2006.01)

(52) U.S. Cl.
CPC .......... *H04M 1/7253* (2013.01); *G06F 1/163* (2013.01); *H04W 4/026* (2013.01); *H04M 1/72572* (2013.01); *H04M 2250/52* (2013.01)

(58) Field of Classification Search
CPC ..... H04W 4/008; H04W 4/025; H04W 4/028; H04W 4/026; H04M 1/7253; H04M 1/72519; H04M 1/72522; H04M 1/72533; H04M 1/72572; H04M 2250/52; G06F 1/163

USPC ................... 455/418, 575.6, 575.2
See application file for complete search history.

(56) References Cited

U.S. PATENT DOCUMENTS

| | | | |
|---|---|---|---|
| 2001/0007817 A1 | 7/2001 | Odagiri et al. | 455/421 |
| 2006/0028339 A1* | 2/2006 | Ogino et al. | 340/539.32 |
| 2008/0220829 A1* | 9/2008 | Akama et al. | 455/574 |
| 2009/0059730 A1 | 3/2009 | Lyons et al. | 368/69 |
| 2009/0191922 A1* | 7/2009 | Rokusek | H04M 1/6075 455/569.2 |
| 2011/0058052 A1* | 3/2011 | Bolton | H04M 1/7253 348/211.99 |
| 2011/0177780 A1* | 7/2011 | Sato et al. | 455/41.1 |
| 2012/0127105 A1* | 5/2012 | Kim | 345/173 |

(Continued)

FOREIGN PATENT DOCUMENTS

WO WO 2013/010150 A1 1/2013

OTHER PUBLICATIONS

European Search Report issued in application No. 14001996.9 dated Nov. 6, 2014.

(Continued)

*Primary Examiner* — Erica Navar
(74) *Attorney, Agent, or Firm* — KED & Associates LLP

(57) ABSTRACT

An electronic device with watch phone functionality and a method of controlling the same are provided. Upon receiving predetermined input on the display of the watch phone, the electronic device transmits a control signal for creating a wireless link to a mobile terminal which will connect with the watch phone, and transmits location information on the mobile terminal and a captured image of the surroundings to the watch phone. Accordingly, the user can locate the mobile terminal more easily using the watch phone.

15 Claims, 21 Drawing Sheets

(56) References Cited

U.S. PATENT DOCUMENTS

| | | | |
|---|---|---|---|
| 2012/0274962 A1* | 11/2012 | Thomas et al. | 358/1.12 |
| 2013/0107674 A1* | 5/2013 | Gossweiler, III | G04G 17/06 368/10 |
| 2014/0030982 A1* | 1/2014 | Cardona | 455/67.11 |
| 2014/0129949 A1* | 5/2014 | Singer | H04L 67/18 715/733 |
| 2014/0136986 A1* | 5/2014 | Martin et al. | 715/748 |

OTHER PUBLICATIONS

"User guide SmartWatch MN2 Contests", Dec. 31, 2011, pp. 1-19, XP055149569, Retrieved from the Internet: URL:http:/www-support-downloads.sonymobile.com/mn2/userguide_EN_MN2_1258-0295.3.pdf.

"Press Release Introducing Sony SmartWatch2—the world's first water-resistant smartwatch with NFC Connectivity", Jun. 25, 2013, pp. 1-6, XP055149514, Retrieved from the Internet: URL:http://blogs.sonymobile.com/wp-content/uploads/2013/06/SmartWatch_2_press_release.pdf.

"User guide Smartwatch 2", Jul. 31, 2013, pp. 1-18, XP055149582, Retrieved from the Internet: URL:http://www-support-downloads.sonymobile.com/sw2/userguide_EN_SW2_3.pdf.

* cited by examiner

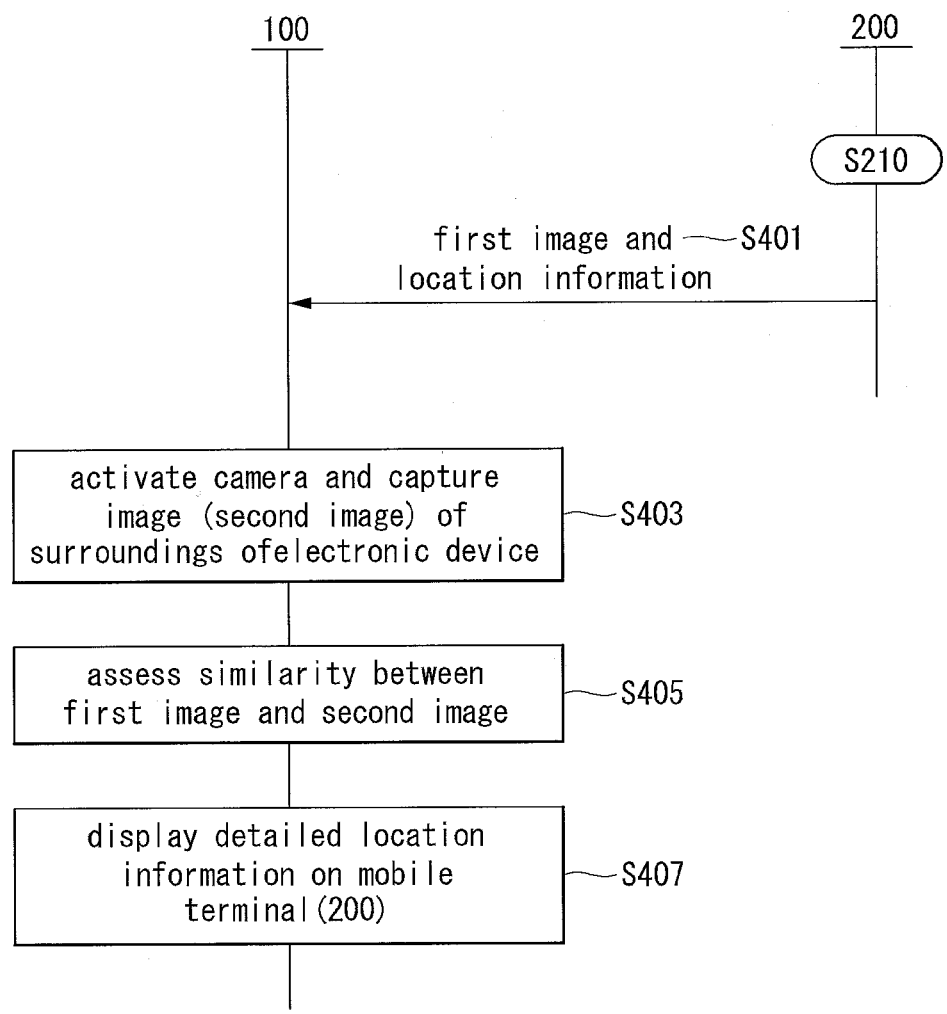

FIG. 18a
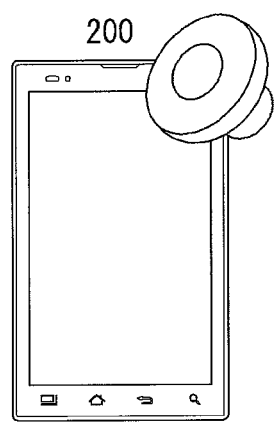
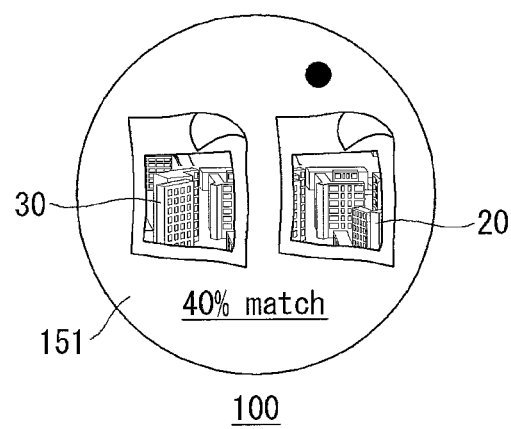

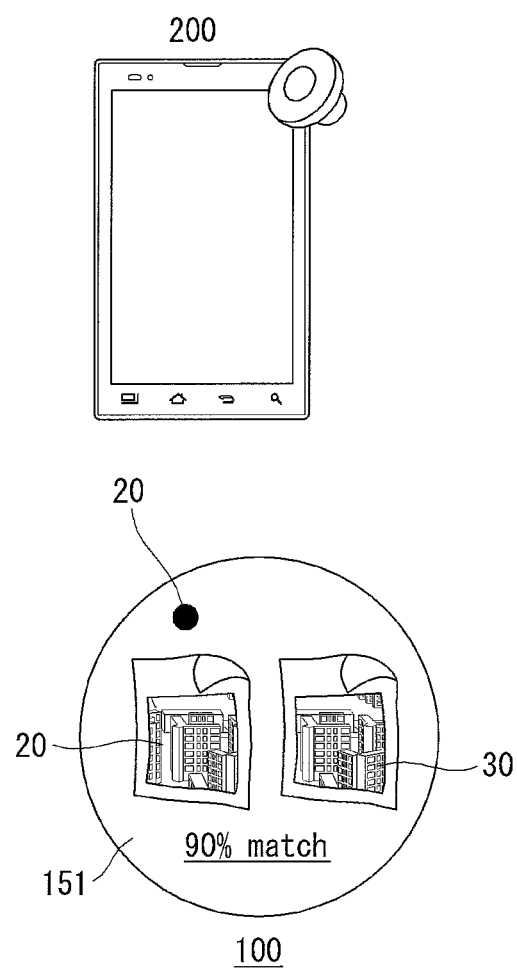

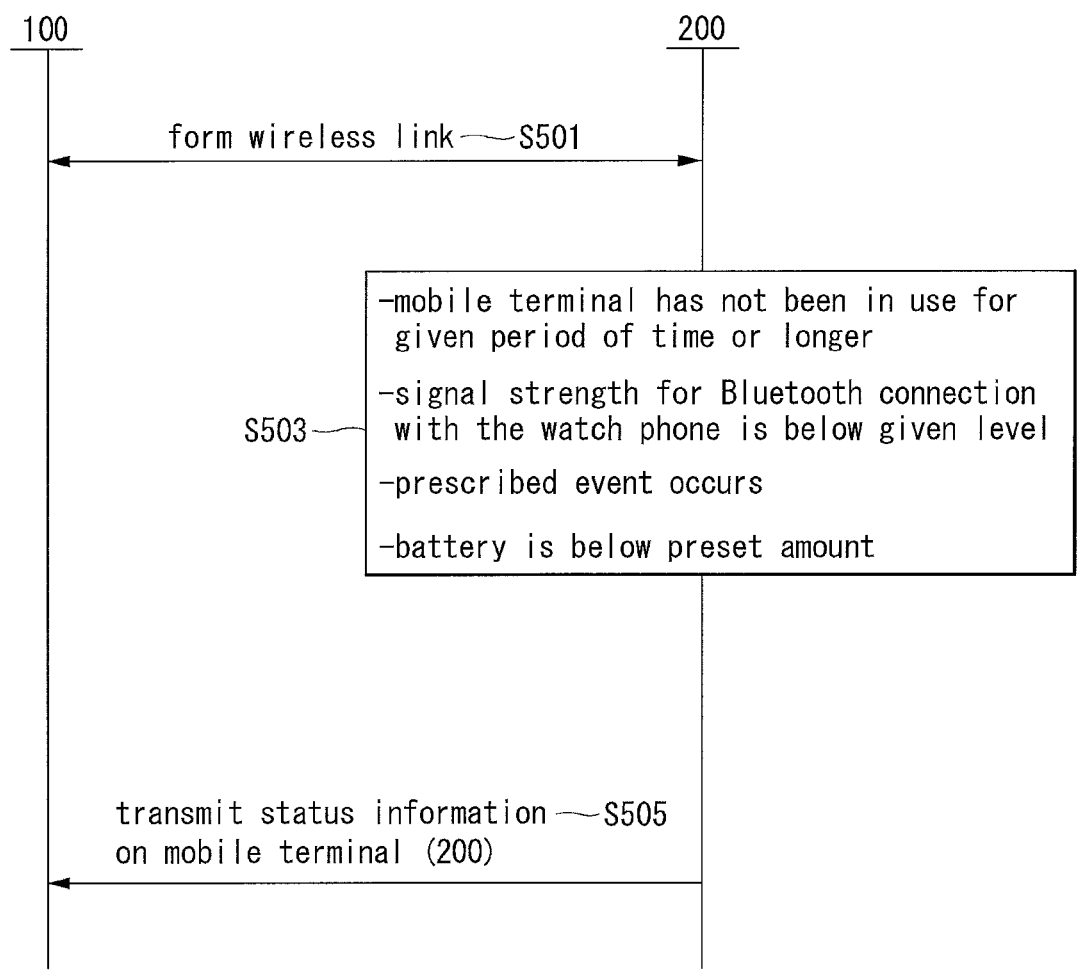

ELECTRONIC DEVICE AND METHOD OF CONTROLLING THE SAME

CROSS-REFERENCE TO RELATED APPLICATION(S)

Pursuant to 35 U.S.C. §119(a), this application claims the benefit of earlier filing date and right of priority to Korean Patent Application No. 10-2013-0079744, filed on 8 Jul. 2013, the contents of which are incorporated by reference herein in their entirety.

BACKGROUND

1. Field

The present invention relates to an electronic device, and more particularly, to an electronic device with watch phone functionality which allows a user to easily locate an external mobile terminal through the electronic device and a method of controlling the same.

2. Background

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

As a terminal is widely used, user's demands for easy edition of displayed objects increase.

SUMMARY

An aspect of the present invention is to provide an electronic device with watch phone functionality which may easily interface with an external mobile electronic device using a watch phone and allows a user to locate the mobile electronic device more easily using the low-power feature of the watch phone, and a method of controlling the same.

One exemplary embodiment of the present invention provides an electronic device, the electronic device including: a wireless communication unit; a display; and a controller configured to transmit a control signal to a predetermined external mobile terminal through the wireless communication unit upon receiving predetermined input on the display, in order to create a wireless link with the mobile terminal.

The display may further include a sensing unit provided at a boundary surface of the display and configured to sense user's touch input, and the controller may be configured to transmit the control signal to the mobile terminal upon receiving a predetermined pattern of touch input through the sensing unit.

The display unit may be in the off state while the sensing unit is sensing user's touch input.

The predetermined pattern of touch input may include at least one of the following: drag input entered along the perimeter of the boundary surface, drag input entered by multi-touch, touch input on the boundary surface that lasts for a predetermined period of time, and no touch input for a predetermined period of time after touch input on the boundary surface.

The controller may be configured to periodically receive location information on the mobile terminal through the wireless communication unit, and upon receiving the predetermined pattern of touch input, automatically transmit the control signal to the mobile terminal if the electronic device is apart from the mobile terminal by a predetermined distance or more.

The control signal may include at least one of a signal for activating the camera of the mobile terminal and capturing the surroundings of the mobile terminal and a signal requesting location information on the mobile terminal and an image captured of the surroundings.

The controller may be configured to display a predetermined indicator in a region of the display upon receiving location information of the mobile terminal from the mobile terminal, in order to detect in which direction the mobile terminal is located relative to the electronic device.

The position of the indicator on the display may be changed in real time.

The controller may be configured to receive a first image captured by the mobile terminal and to further display the first image on the display.

The electronic device may further include a camera, wherein the controller is configured to activate the camera and capture the surroundings of the electronic device upon receiving the first image.

The controller may be configured to determine the similarity between the first image and the second image by comparing the first image with a second image captured by the electronic device.

The controller may change display properties of the display upon receiving an input to drag an indicator displayed on the region of the display to a central region of the display.

The controller may be configured to transmit the control signal to the mobile terminal upon receiving touch input on at least part of predetermined content displayed on the content.

The control signal may include a signal for displaying at least part of the content on the display of the mobile terminal.

The controller may be configured to receive location information from the mobile terminal and transmit a signal for outputting an audio signal through the mobile terminal or a predetermined message to the mobile terminal based on the location information.

Another exemplary embodiment of the present invention provides a method of controlling an electronic device with watch phone functionality, the method including: receiving predetermined input on a display; and transmitting a control signal to the mobile terminal to create a wireless link with an external mobile terminal in response to the predetermined input.

The receiving of predetermined input on the display may include receiving a predetermined pattern of touch input by a sensing unit provided at a boundary surface of the display and configured to sense user's touch input.

The transmitting of a control signal to the mobile terminal may further include: periodically receiving location information on the mobile terminal through the wireless communication unit; and upon receiving the predetermined pattern of touch input, automatically transmitting the control signal to the mobile terminal if the electronic device is apart from the mobile terminal by a predetermined distance or more.

The method may further include receiving a first image captured of the surroundings of the mobile terminal and location information on the mobile terminal from the mobile terminal.

The method may further include displaying a predetermined indicator in a region of the display upon receiving location information of the mobile terminal from the mobile terminal, in order to detect in which direction the mobile terminal is located relative to the electronic device.

The method may further include: activating a camera equipped in the electronic device upon receiving the first image; acquiring a second image captured of the surroundings of the electronic device with the camera; and determining the similarity between the first image and the second image.

An electronic device according to an aspect of the present invention includes a wearable band, a display, and a controller configured to determine a wearing state of the band based on at least one of a tightening degree and a width of the band, to switch an operation mode of the electronic device according to the determined wearing state of the band, and to display a user interface corresponding to the operation mode on the display.

The controller may be configured to detect the wearing state of the band as a first wearing state in which the band is worn on a user's wrist and a second wearing state in which the band is worn on a user's arm.

The band may include a sensing unit configured to sense an area making contact with the user's body, and the controller may be configured to detect the tightening degree of the band based on the sensed area.

The controller may be configured to determine that a wearing location of the band is the wrist when the area making contact with the user's body is within a first area range. The controller may be configured to determine that a wearing location of the band is the arm when the area making contact with the user's body is within a second area range greater than the first area range.

When the band is worn on the user's wrist to have a predetermined elliptical shape, the width of the band may be a length of a long axis and a length of a short axis of the elliptical shape.

When the width of the band is within a first range, the controller may be configured to determine that a wearing location of the band is the wrist. When the width of the band is within a second range, the controller may be configured to determine that a wearing location of the band is the arm.

The operation mode of the electronic device may include a mode to execute a specific application. When it is determined that the wearing location of the band is the arm, the controller may be configured to automatically execute an application capable of confirming an exercise amount of the user.

When the controller determines that wearing of the band is released based on at least one of a tightening degree and a width of the band, the controller may be configured to enter the operation mode of the electronic device as at least one of a charging mode, a saving mode, a synchronizing mode, and a connection mode with another electronic device.

The controller may be configured to switch the operation mode of the electronic device based on a wearing time of the band, a wearing release time of the band, and a lapse time after the wearing release time of the band.

The electronic device may further include a memory to store information on the tightening degree and the width of the band with respect to a specific user.

The electronic device may include watch phone functionality.

An electronic device according to an aspect of the present invention provides a method of controlling an electronic device with a wearable band, the method including determining a wearing state of the band based on at least one of a tightening degree and a width of the band; controlling an operation mode of the electronic device according to the determined wearing state of the band, and displaying a user interface corresponding to the operation mode on the display.

According to the present invention, the user can locate an external mobile terminal easily using the watch phone they are wearing on the wrist on lower power.

According to the present invention, forming a wireless link between the watch phone and a registered external mobile terminal becomes easier.

BRIEF DESCRIPTION OF THE DRAWINGS

The embodiments will be described in detail with reference to the following drawings in which like reference numerals refer to like elements wherein:

FIG. 17 is a flowchart of a method of controlling an electronic device according to a fourth exemplary embodiment of the present invention;

FIGS. 18a and 18b are views for explaining the fourth exemplary embodiment of the present invention; and FIG. 19 is a diagram for explaining an example of informing an electronic device with a watch phone of the status of an external mobile terminal.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

An electronic device may be described below with reference to the accompanying drawings. In the following description, suffixes "module" and "unit" may be given to components of the electronic device in consideration of only facilitation of description and do not have meanings or functions discriminated from each other.

The electronic device may include a cellular phone, a smart phone, a laptop computer, a digital broadcasting terminal, personal digital assistants (PDA), a portable multimedia player (PMP), a navigation system and/or so on.

Figure 1:
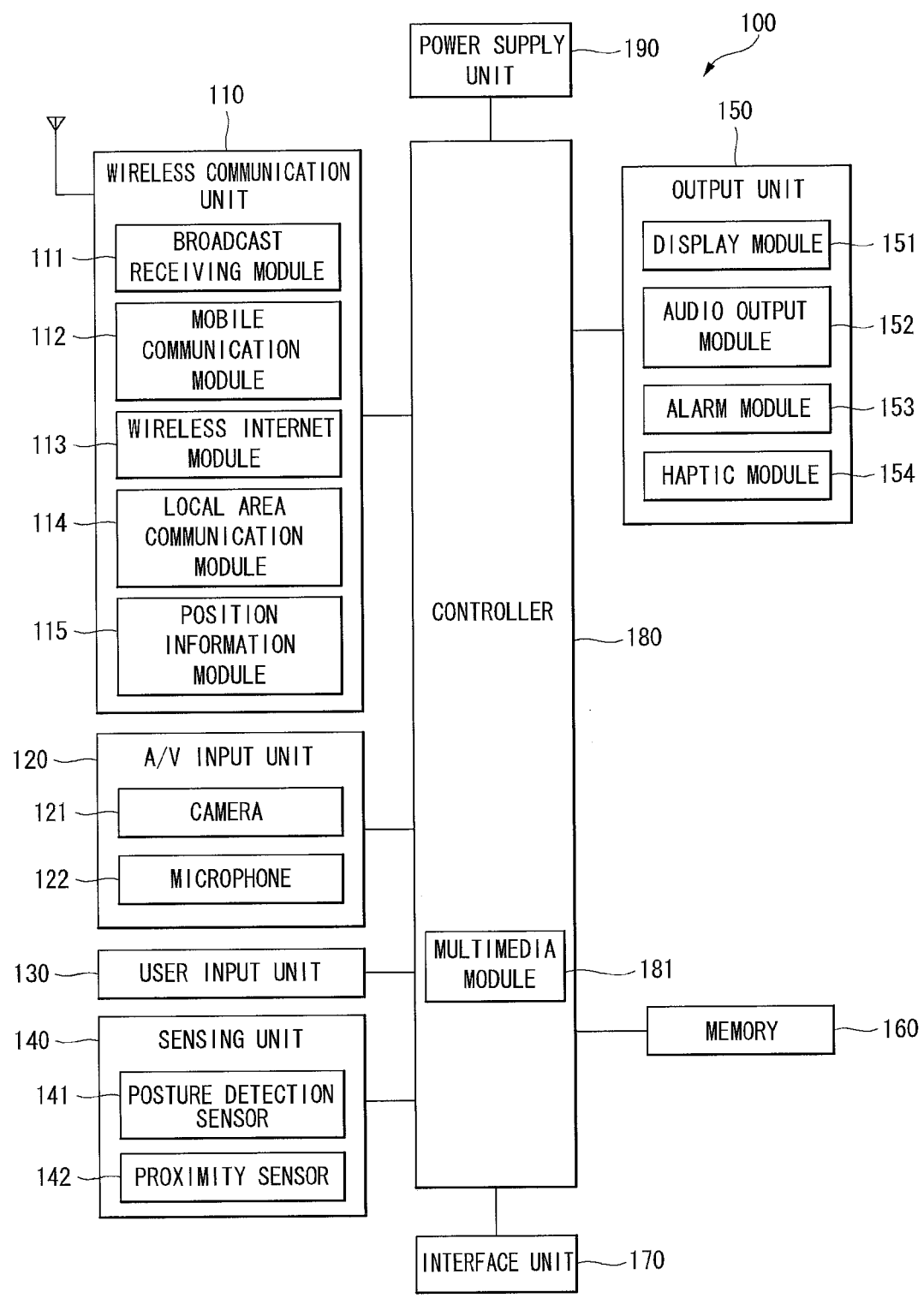
FIG. 1 is a block diagram of an electronic device according to an embodiment.
Figure 2:
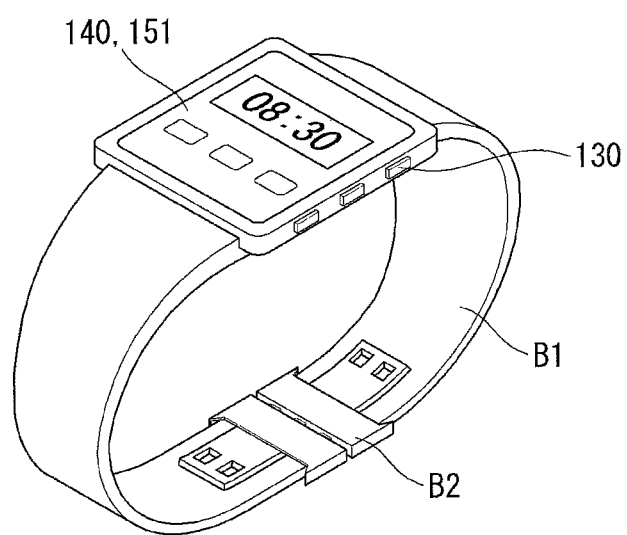
FIGS. 2 and 3 are perspective views showing the outer appearance of an electronic device with watch phone functionality according to an exemplary embodiment of the present invention.
Figure 3:
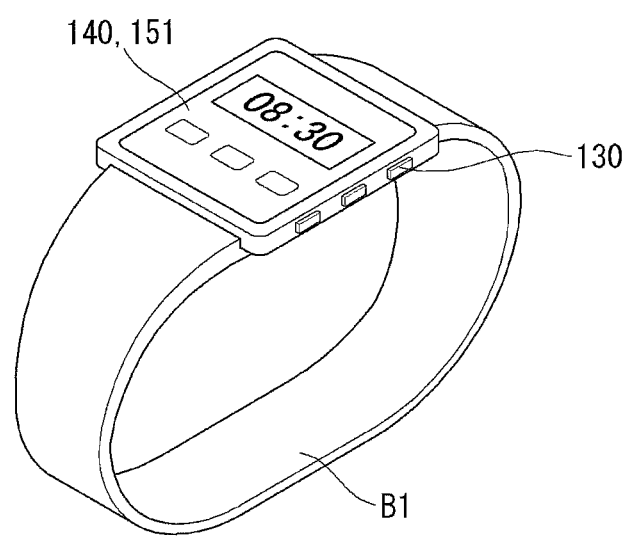

FIG. 1 is a block diagram of an electronic device according to an embodiment. Other embodiments, configurations and arrangements may also be provided.

As shown, the electronic device 100 may include a wireless communication unit 110 (or radio communication unit), an audio/video (NV) input unit 120, a user input unit 130, a sensing unit 140, an output unit 150, a memory 160, an interface 170, a controller 180, and a power supply 190. The components shown in FIG. 1 may be essential parts and/or a number of components included in the electronic device 100 may vary. Components of the electronic device 100 may now be described.

The wireless communication unit 110 may include at least one module that enables radio communication between the electronic device 100 and a radio communication system or between the electronic device 100 and a network in which the electronic device 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the electronic device 100or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or ZigBee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The electronic device 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the electronic device 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the electronic device 100 is in the call mode. The display 151 may also display a captured and/or received image, a UI or a GUI when the electronic device 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the electronic device 100 that is occupied by the display 151.

The electronic device 100 may also include at least two displays 151. For example, the electronic device 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The electronic device 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The electronic device 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the electronic device 100 or transmit data of the electronic device 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the electronic device 100 through a port of the interface 170.

The interface 170 may also be a path through which power from an external cradle is provided to the electronic device 100 when the electronic device 100 is connected to the external cradle or a path through which various command signals input by the user through the cradle are transmitted to the mobile terminal 100. The various command signals or power input from the cradle may be used as signals for confirming whether the electronic device 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the electronic device 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 4:
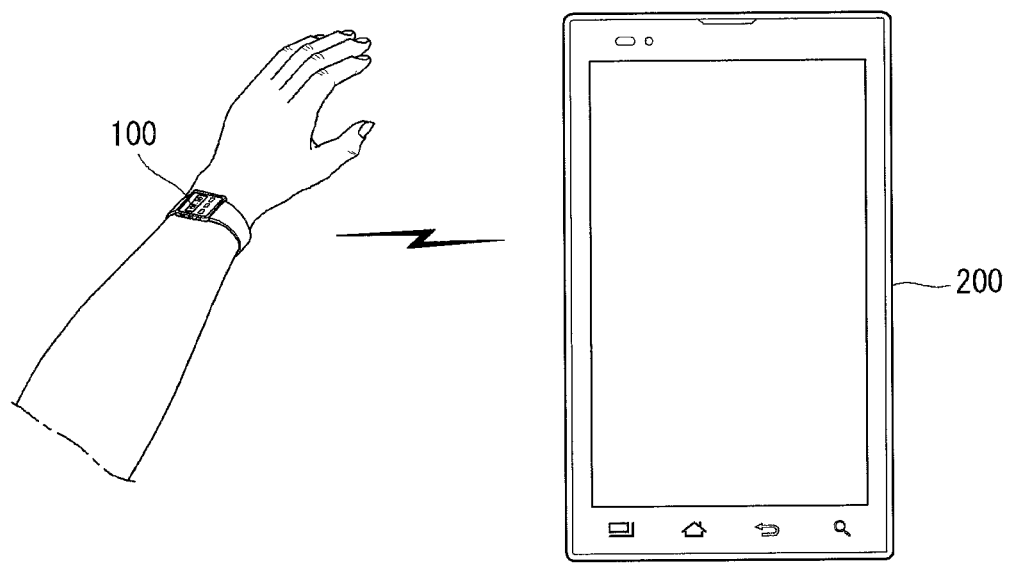
FIG. 4 is a diagram showing a configuration a system for explaining an exemplary embodiment of the present invention.

FIG. 4 is a diagram showing a configuration a system for explaining an exemplary embodiment of the present invention.

Referring to FIG. 4, the exemplary embodiment of the present invention may be implemented by forming a wireless link between an electronic device 100 with watch phone functionality and a mobile terminal 200. The electronic device 100 may be worn on the user's wrist, and the mobile terminal 200 may be within a predetermined distance from the electronic device 100. If the mobile terminal 200 is within a predetermined distance from the electronic device 100, the electronic device 100 and the mobile terminal 200 may interface with each other through short-range communication.

Alternatively, the electronic device 100 and the mobile terminal 200 may be at locations where they share the same access point AP.

On the other hand, if the electronic device 100 and the mobile terminal 200 are at a far distance from each other where they can communicate through short-range communication.

The electronic device 100 with watch phone functionality may store device information on the mobile terminal 200, and easily locate the mobile terminal 200 by means of the electronic device 100.

Figure 5:
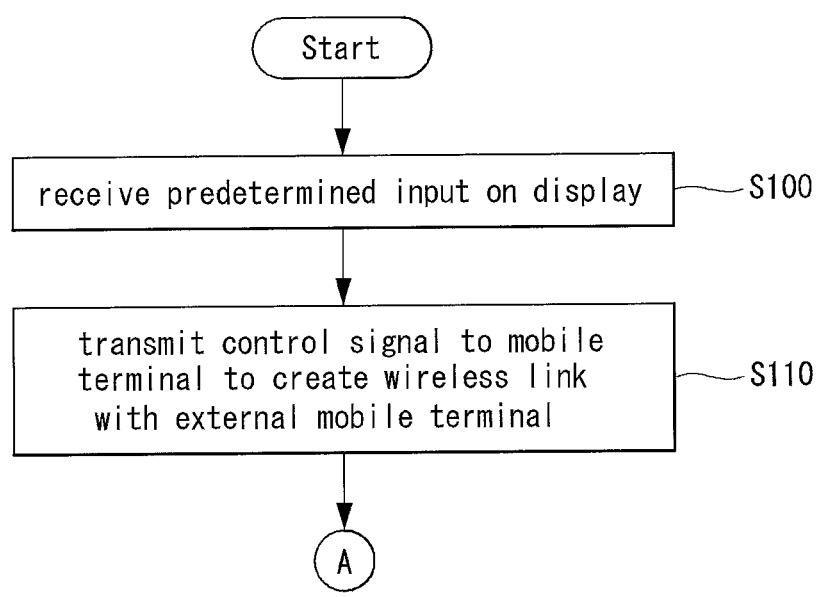
FIG. 5 is a flowchart of a method of controlling an electronic device according to a first exemplary embodiment of the present invention.
Figure 6:
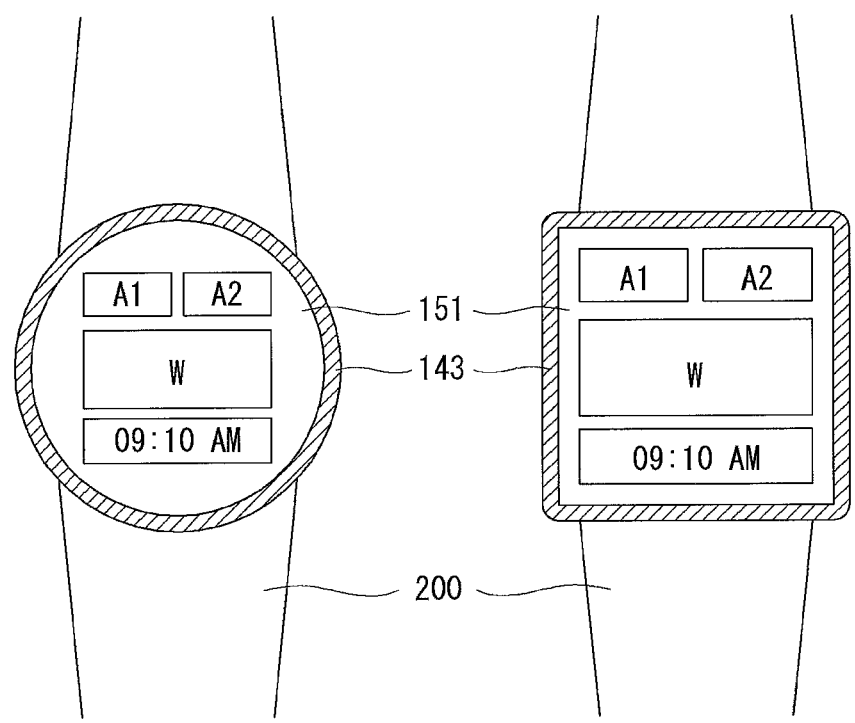
FIG. 6 is a view for explaining a sensing unit provided at a boundary surface of the display of an electronic device with watch phone functionality.
Figure 7:
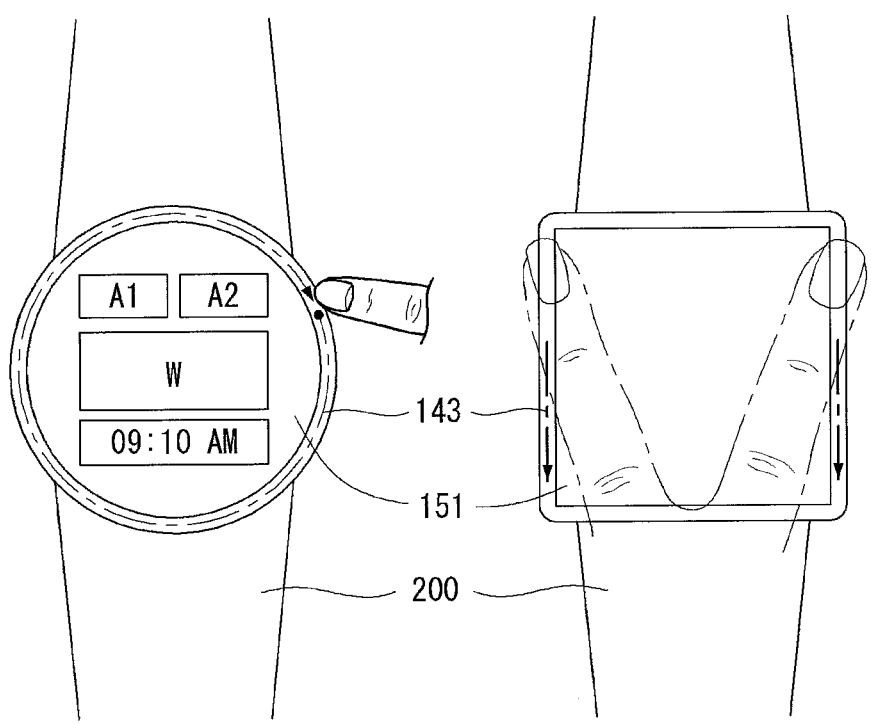
FIG. 7 is a view for explaining S100 of FIG. 5.

FIG. 5 is a flowchart of a method of controlling an electronic device according to a first exemplary embodiment of the present invention. FIGS. 6 and 7 are views for explaining the method of controlling an electronic device according to the first exemplary embodiment of the present invention.

The method of controlling an electronic device according to the first exemplary embodiment of the present invention may be implemented in the electronic device 100 explained with reference to FIGS. 1 to 4. Hereinafter, the method of controlling an electronic device according to the first exemplary embodiment of the present invention and the operation of the electronic device 100 for implementing the same will be described with reference to the drawings as necessary.

Referring to FIG. 5, the controller 180 of the electronic device 100 with watch phone functionality receives predetermined input on the display 151 (S100).

The predetermined input on the display 151 will be explained with reference to FIGS. 6 and 7.

FIG. 6 is a view for explaining a sensing unit provided at the boundary surface of the display 151 of an electronic device with watch phone functionality.

Referring to FIG. 6, the controller 180 may receive predetermined input through a sensing unit 143 provided at the boundary surface of the display 151.

The sensing unit 143 may sense user's touch input. The sensing unit 143 may detect a predetermined touch pattern entered by the user.

For example, the sensing unit 143 may sense a touch pattern that the user enters by drawing a circle along a boundary surface of the display 151.

Further, if the display 151 of the electronic device 100 has a rectangular shape, for example, the sensing unit 143 may sense a touch pattern of drag input that the user enters by multi-touching the boundary surface of the display 151.

Meanwhile, although the sensing unit 143 to be explained according to one exemplary embodiment of the present invention is positioned at the boundary surface of the display 151, it may be distinguished from the display 151. For example, the sensing unit 143 may consist of a separate module, regardless of whether power is supplied to the display 151 or not.

That is, the controller 180 may temporarily turn off the power supplied to the display 151. That is, if there is no input on the display 151 for a predetermined period of time, the controller 180 may turn off the display 151. When the display 151 is in the off state, the sensing unit 143 may sense user's touch input.

Meanwhile, the controller 180 of the electronic device 100 may provide at least one application A1 and A2, a widget icon W, a watch area, etc. to the display 151.

Meanwhile, the input on the display 151 is input for accessing a predetermined mobile terminal 200.

That is, the controller 180 may transmit a control signal to the mobile terminal 200 to create a wireless link with an external mobile terminal (S110).

That is, when a predetermined touch pattern is input on the watch phone, the watch phone may transmit a control signal to the mobile terminal 200 to form a wireless link with a predetermined external mobile terminal.

FIG. 7 is a view for explaining S100 of FIG. 5.

Referring to FIG. 7, predetermined input received on the display 151 may be, for example, touch input (drag input) on the sensing unit 143 provided at the boundary surface of the display 151 of the watch phone 100, which is drawn along the perimeter of the sensing unit 143.

Meanwhile, when the display 151 has a rectangular shape, the predetermined input may be drag input along a perimeter of the display 151 which is entered by multi-touch.

The predetermined input is not limited to the aforementioned examples. For example, the predetermined input may include touch input on the boundary surface (sensing unit 143) of the display 151 which provides access to the mobile terminal 200 from the watch phone 100 and lasts for a predetermined period of time. Moreover, the predetermined input may include no touch input for a predetermined period of time after touch input on the boundary surface.

That is, the watch phone 100 may attempt to form a wireless link with the external mobile terminal 200 through various forms of input on the display 151 (including the sensing unit 143).

Meanwhile, upon receiving a predetermined touch pattern along the boundary surface of the display 151 while the display 151 is in the off state, as described above, an operation for accessing the external mobile terminal 200 may be performed without turning on the display 151.

Accordingly, the electronic device 100 with watch phone functionality can be used to interface with the external mobile terminal 200 at low power.

The process to be done before interfacing the watch phone 100 and the mobile terminal 200 has been described so far. Hereinafter, the operations of the watch phone 100 and the mobile terminal 200 after interfacing the watch phone 100 and the mobile terminal 200 will be described.

Figure 8:
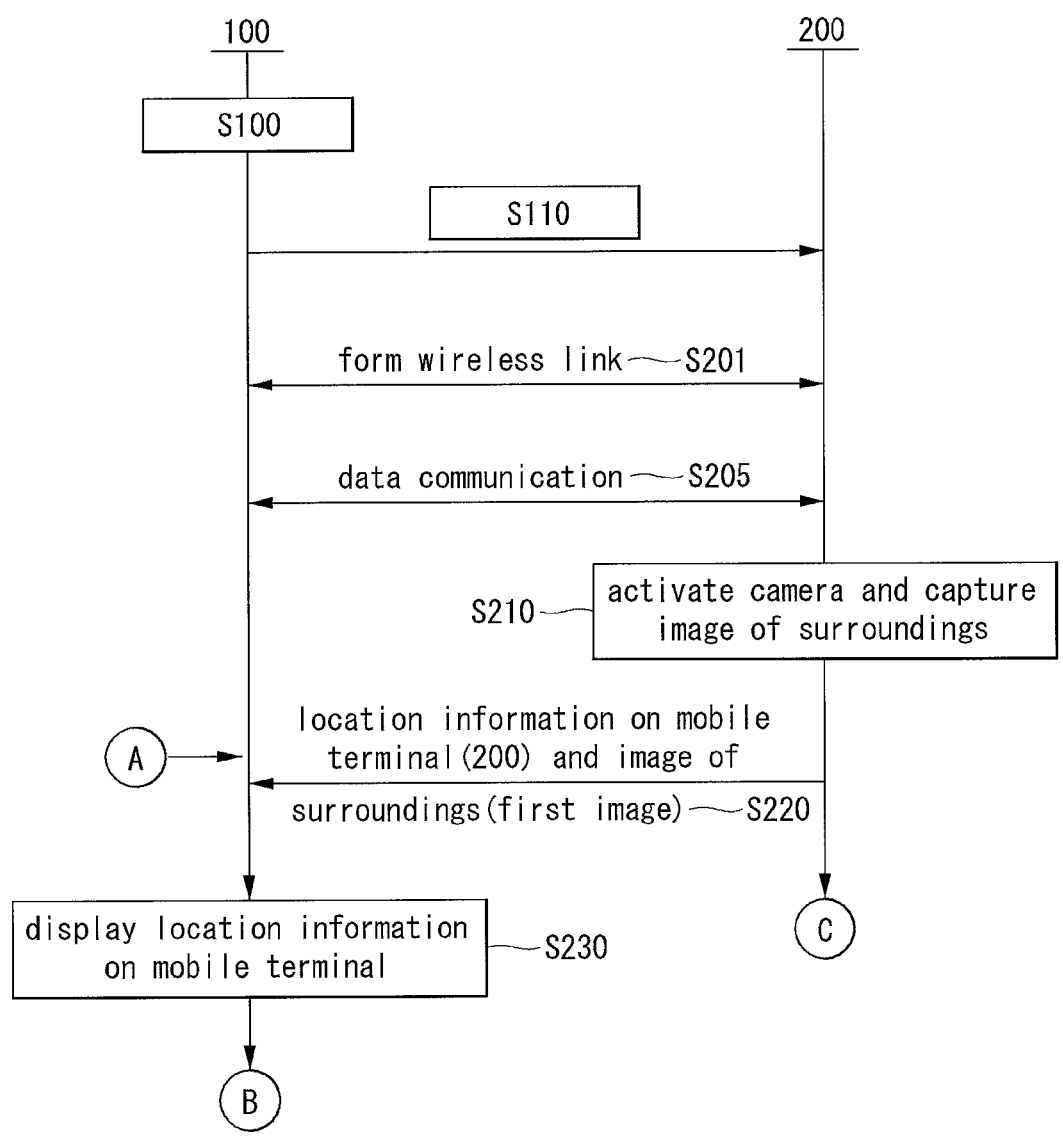
FIG. 8 is a flowchart of a method of controlling an electronic device according to a second exemplary embodiment of the present invention.
Figure 9:
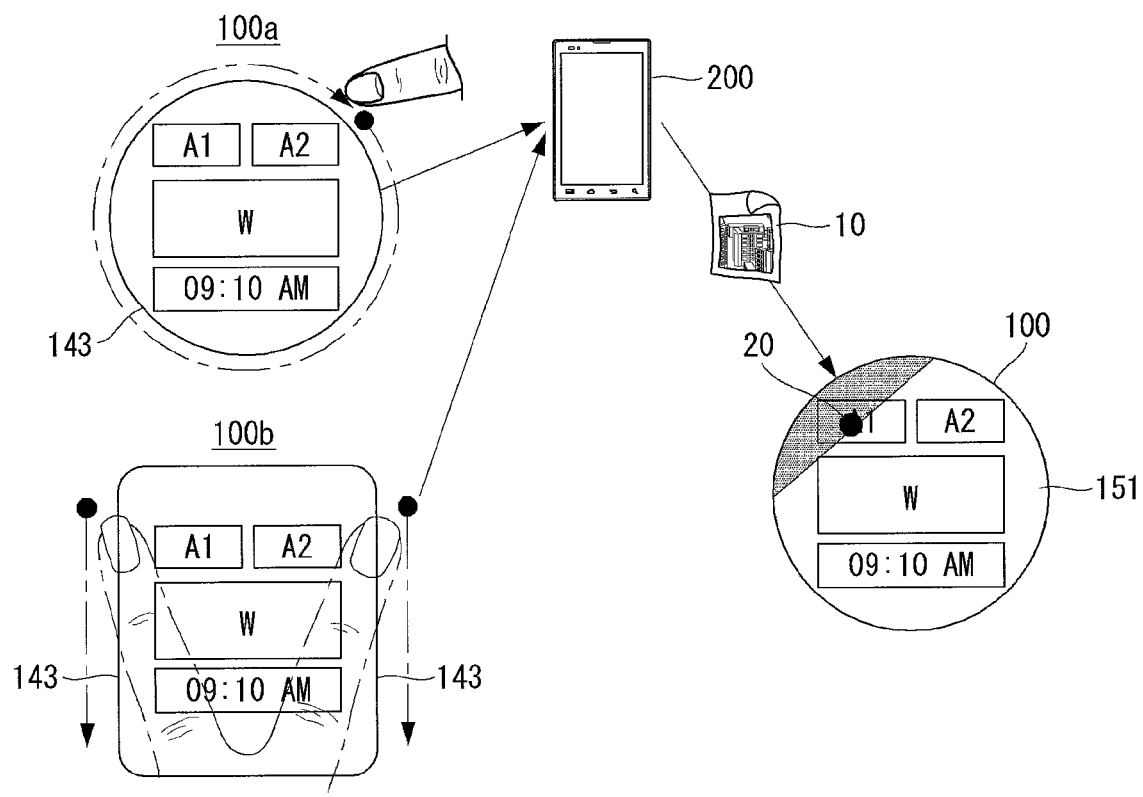
FIGS. 9 and 10 are views for explaining S230 of FIG. 8.
Figure 10:
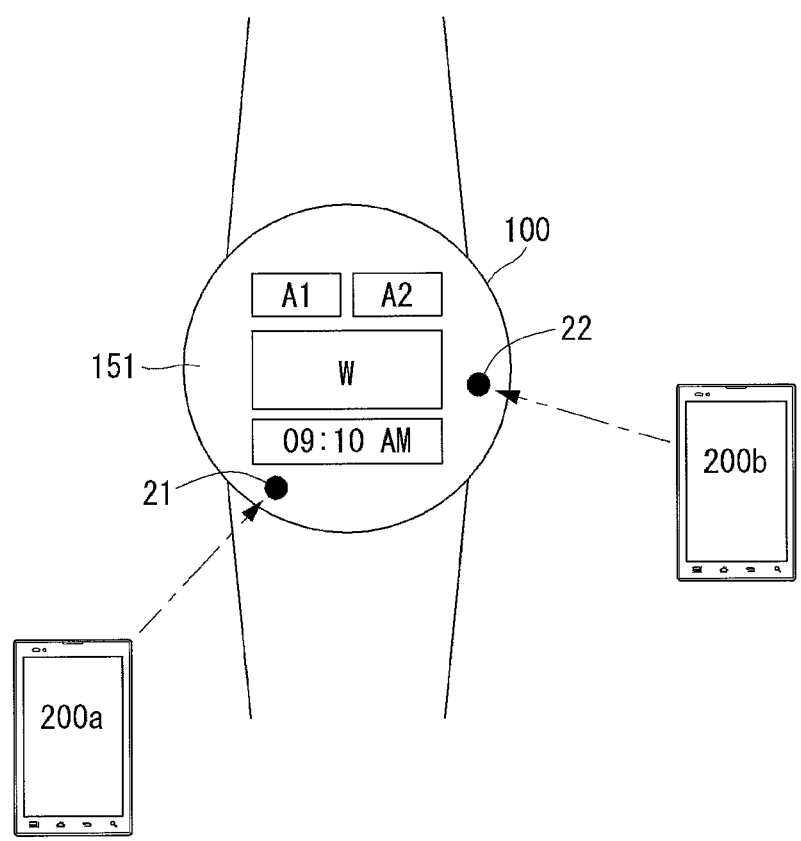
Figure 11:
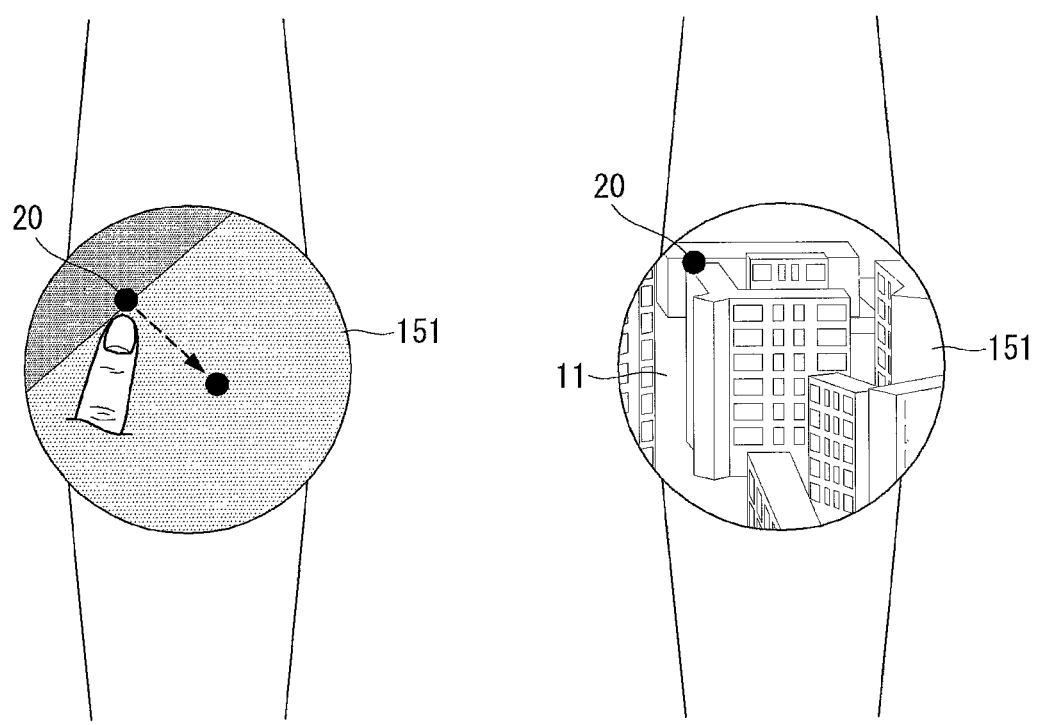
FIG. 11 is a view for explaining an example of displaying an image received from an external mobile terminal on the display of the watch phone.

FIG. 8 is a flowchart of a method of controlling an electronic device according to a second exemplary embodiment of the present invention. FIGS. 9 to 11 are views for explaining the method of controlling an electronic device according to the second exemplary embodiment of the present invention.

The method of controlling an electronic device according to the second exemplary embodiment of the present invention may be implemented in the electronic device 100 explained with reference to FIGS. 1 to 4. Hereinafter, the method of controlling an electronic device according to the second exemplary embodiment of the present invention and the operation of the electronic device 100 for implementing the same will be described with reference to the drawings as necessary. The second exemplary embodiment of the present invention to be described later may presuppose the foregoing first exemplary embodiment of the present invention.

Referring to FIG. 8, the controller 180 receives predetermined input on the display 151 (S100). The controller 180 transmits a control signal to the mobile terminal 200 in response to the predetermined input, in order to create a wireless link with the external mobile terminal 200 (S110).

The wireless link may denote a link for data communication between the electronic device 100 and the mobile terminal 200. The wireless link may be connected through short-range communication, Bluetooth.

The mobile terminal 200 may access a request from the electronic device 100 and form a wireless link with the electronic device 100 (S201).

The electronic device 100 and the mobile terminal 200 may interface with each other via the wireless link and perform data communication (S205).

The control signal transmitted to the mobile terminal 200 by the electronic device 100 with watch phone functionality may include a control command that activates the camera of the mobile terminal 200 to capture the surroundings of the mobile terminal 200.

Further, the control signal may include a control command for requesting location information on the mobile terminal 200. The location information may be measured by a GPS module. Further, the location information may include coordinate information, regional information, etc. acquired by the GPS module.

The location information acquired by a GPS module equipped in the mobile terminal 200 may be identical to that acquired by a GPS module equipped in the electronic device 100. If the electronic device 100 and the mobile terminal 200 are at a short distance from each other, the location information acquired by their GPSs may be identical.

Accordingly, the mobile terminal 200 may activate the camera in response to a control signal received from the electronic device 100 and capture the surroundings of the mobile terminal through the camera (S210).

The range in which the camera of the mobile terminal 200 can capture images may include the surroundings in 360 degrees around the mobile terminal.

At least one image of the surroundings may be captured by the mobile terminal 200. Images of the surroundings may include still images and/or video.

The electronic device 100 may receive location information on the mobile terminal 200 and an image (first image) of the surroundings (S220).

Afterwards, the controller 180 of the electronic device 100 may display the location information on the mobile terminal 200 on the display 151 (S230).

FIGS. 9 and 10 are views for explaining S230 of FIG. 8.

Referring to FIG. 9, upon receiving a predetermined pattern of touch input on the sensing unit 143 at the interface of the display 151 of an electronic device 100a and 100b with watch phone functionality, the controller 180 transmits a predetermined control signal to the mobile terminal 200. As described above, the control signal may include a signal requesting the mobile terminal 200 to interface with the electronic device 100 and a signal requesting location information on the mobile terminal 200.

Having received the control signal, the mobile terminal 200 activates the camera, captures a first image of the surroundings, and transmits it to the electronic device 100.

Upon receiving location information from the mobile terminal 200, the controller 180 of the electronic device 100 may display a predetermined indicator 20 in a region of the display 151 so as to detect in which direction the electronic device 100 is located relative to the mobile terminal is.

For example, the predetermined indicator 20 displayed on the display 151 may be at the 11 o'clock position. It can be seen that the mobile terminal 200 is at the 11 'o clock position from the electronic device 100.

Moreover, upon receiving location about the mobile terminal, the controller 180 may display the predetermined indicator 20 so that one region of the display 151 has different display properties than other regions. For example, the display properties may include color, shade, etc. That is, the controller 180 may control the display 151 displaying the predetermined indicator 20 so that one region and the surroundings of this region look brighter than other regions.

FIG. 10 illustrates an example of displaying indicators 21 and 22 indicating location information on mobile terminals 200a and 200b. For example, the electronic device 100 receives location information from the mobile terminals 200a and 200b. If the first mobile terminal 200a is at the 7 'o clock position from the electronic device 100, the first indicator 21 is displayed in a region of the display 151 facing the 7 'o clock position, based on the received location information. And, if the second mobile terminal 200b is at the 3 'o clock position from the electronic device 100, the second indicator 22 is displayed in a region of the display 151 facing the 3 'o clock position.

The location of the mobile terminal 200 may change in real time relative to the electronic device 100. In this case, real-time changes in the location of the mobile terminal 200 may be reflected when displaying the location of the mobile terminal 200 on the display 151 of the watch phone 100.

FIG. 11 is a view for explaining an example of displaying an image received from an external mobile terminal on the display of the watch phone.

Referring to FIG. 11, upon receiving drag input for moving a predetermined indicator 20 to a center region of the display 151 to indicate location information on the mobile terminal 200, the controller 180 may display a first image 11 received from the mobile terminal 200 on the display 151.

The first image is an image of the surroundings captured by the mobile terminal 200. The user of the watch phone 100 can locate the mobile terminal 200 using the first image.

Figure 12:
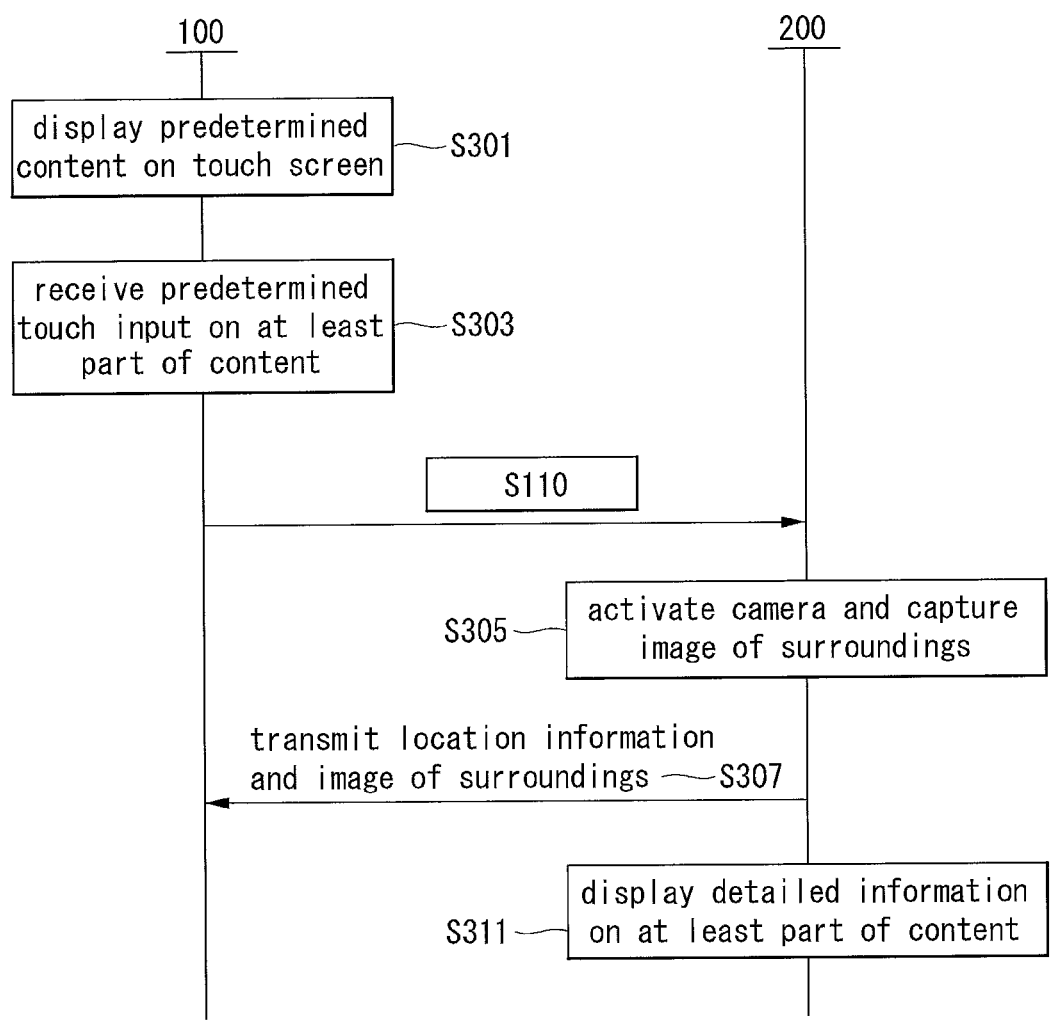
FIG. 12 is a flowchart of a method of controlling an electronic device according to a third exemplary embodiment of the present invention.
Figure 13:
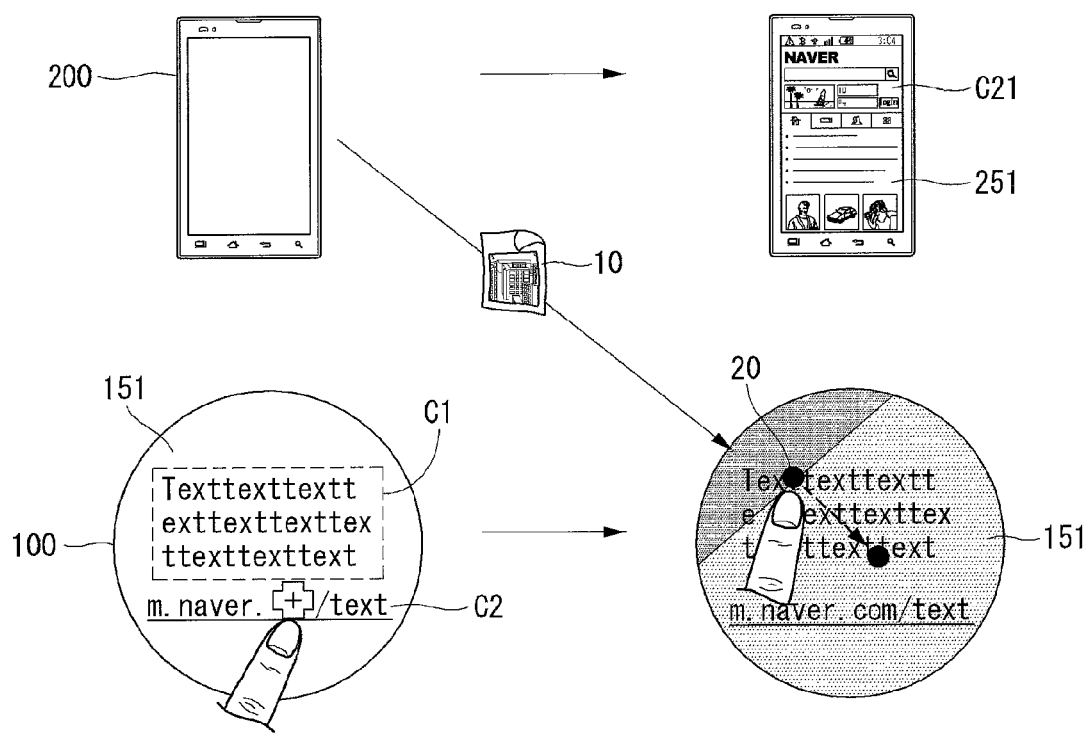
FIGS. 13 and 14 are views for explaining the third exemplary embodiment of the present invention.
Figure 14:
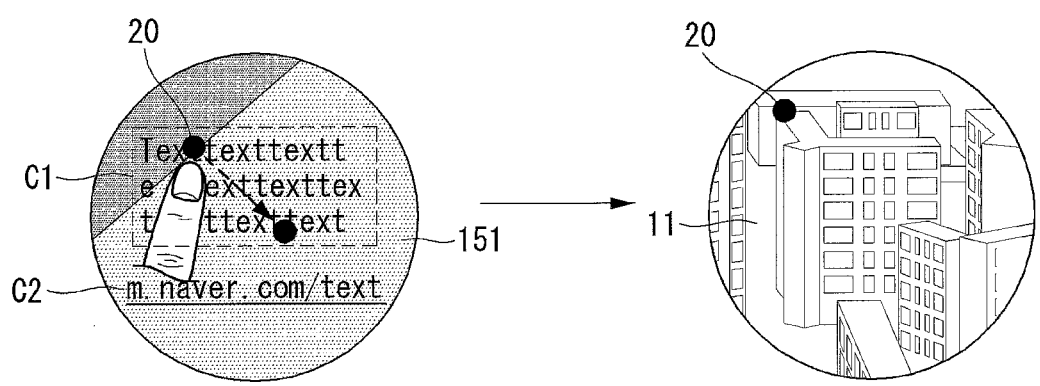

FIG. 12 is a flowchart of a method of controlling an electronic device according to a third exemplary embodiment of the present invention. FIGS. 13 and 14 are views for explaining the third exemplary embodiment of the present invention. The method of controlling an electronic device according to the third exemplary embodiment of the present invention may be implemented in the electronic device 100 explained with reference to FIGS. 1 to 4. Hereinafter, the method of controlling an electronic device according to the third exemplary embodiment of the present invention and the operation of the electronic device 100 for implementing the same will be described with reference to the drawings as necessary. The third exemplary embodiment of the present invention to be described later may presuppose the foregoing first and second exemplary embodiments of the present invention.

Referring to FIG. 12, the display 151 of the electronic device 100 with watch phone functionality is wearable on the user's wrist, and the size of the display 151 can be limited to a certain size. That is, the amount of content that can be displayed on the display 151 must be limited due to size limitations of the display 151.

The controller 180 of the electronic device 100 displays predetermined content on the display 151 (hereinafter, referred to as a touch screen) (S301).

The content may include text, images, and image information. The text may include an URL link.

The controller 180 receives predetermined touch input on at least part of the content (S303).

Content that can be chosen by touch input may be text that features a URL link. According to one exemplary embodiment of the present invention, at least part of the content displayed on the watch phone 100 may be displayed on an external electronic device (e.g., mobile terminal 200) that interfaces with the watch phone 100, due to size limitations of the display 151 equipped with the watch phone 100.

According to one exemplary embodiment of the present invention, upon receiving predetermined touch input on the display 151 of the watch phone 100, the electronic device 100 tries to access the external mobile terminal 200. In the third exemplary embodiment of the present invention, upon receiving a predetermined pattern of input on the content displayed on the display 151, the electronic device 100 may try to access the mobile terminal 200.

That is, the controller 180 may try to connect with the mobile terminal 200 upon receiving long touch input on at least part of the content. In other words, the controller 180 may transmit a control signal to the mobile terminal 200 in response to the long touch input, in order to create a wireless link with the external mobile terminal (see S110 of FIG. 5).

Having received the control signal, the mobile terminal 200 may perform the function of a control command corresponding to the control signal transmitted by the electronic device 100. That is, the mobile terminal 200 may acquire a first image by activating the camera and capturing the surroundings (S305).

The electronic device 100 receives from the mobile terminal 200 location information and the first image captured of the surroundings (S307).

Thereafter, the mobile terminal 200 may display on the display detailed information on at least part of the content displayed on the display 151 of the electronic 100 (S311).

In an example, upon receiving long touch input from the user on an URL link displayed on the display 151, the mobile terminal 200 may acquire location information and a first image and transmit them to the electronic device 100, and display a webpage corresponding to the URL link on the display 151 of the mobile terminal 200.

This example will be described in more detail with reference to FIGS. 13 and 14.

Referring to FIG. 13, the controller 180 may display predetermined content C1 and C2 on the display 151. The content may include text C1 and URL information C2. Upon receiving long touch input on the URL information C2, the controller 180 may transmit a control signal to the mobile terminal to create a wireless link with the mobile terminal 200.

In response to the control signal, the mobile terminal 200 may acquire a first image by capturing the surroundings with the camera.

The electronic device 100 may receive the first image and location information on the mobile terminal 200 from the mobile terminal 200.

The electronic device 100 may display an indicator 20 on a region of the display 15 to indicate the relative location of the mobile terminal 200 relative to the electronic device 100.

And, the mobile terminal 200 may receive URL link information the user chooses, and display a webpage corresponding to the URL link on the display 251.

Then, referring to FIG. 14, upon receiving input for dragging the indicator 20 to a center region of the display 151, the received first image 11 may be displayed on the display 151.

Accordingly, the electronic device 100 with watch phone functionality may display the location of the mobile terminal 200 on the display 151 of the watch phone 100 by interfacing with the external mobile terminal 200, and at the same time, overcome size limitations of the display by sharing the content displayed on the display of the watch phone 100 with the mobile terminal 200.

The exemplary embodiments where the location of the mobile terminal 200 can be easily detected through the watch phone 100 by interfacing the watch phone 100 and the external mobile terminal 200 have been described so far.

According to one exemplary embodiment of the present invention, the mobile terminal 200 may be located in a more efficient way by changing the output characteristics of the mobile terminal 200, in addition to the process of providing location information on the mobile terminal 200 through the display 151 of the watch phone 100 by interfacing the watch phone 100 and the mobile terminal 200.

Figure 15:
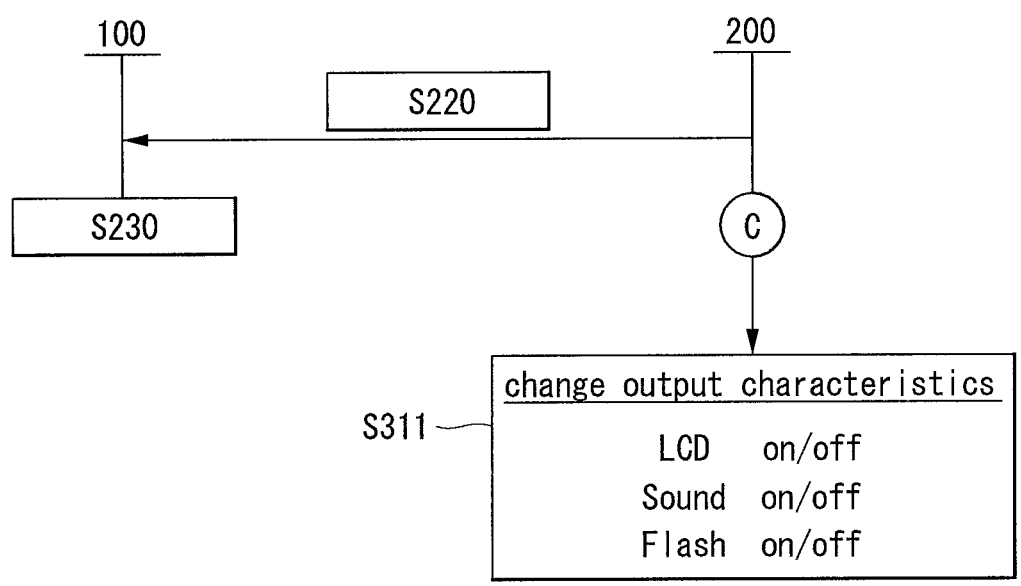
FIGS. 15 to 16b are views for explaining an example of changing the output characteristics of a mobile terminal when an electronic device with a watch phone and the mobile terminal are connected together.
Figure 16A:
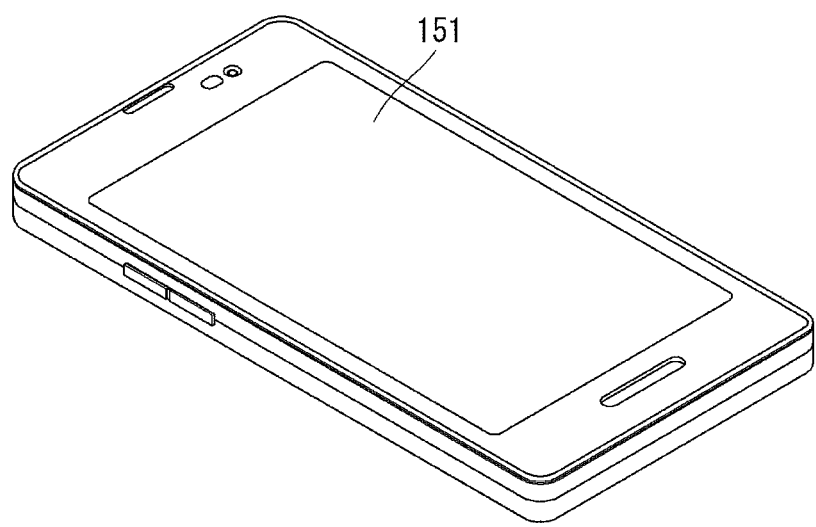
Figure 16B:
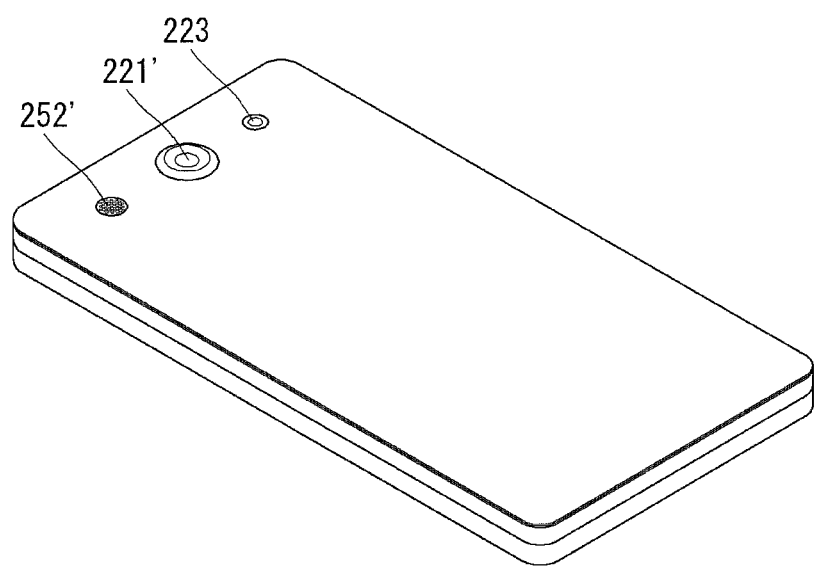

FIGS. 15 to 16*b* are views for explaining an example of changing the output characteristics of a mobile terminal when an electronic device with a watch phone and the mobile terminal are connected together.

Referring to FIG. 15, the electronic device 100 receives location information on the mobile terminal 200 and a first image captured of the surroundings of the mobile terminal 200 from the mobile terminal 200 (S220). And, the electronic device 100 displays the location information on the mobile terminal 200 on the display 151 (S230).

The mobile terminal 200 may change its output characteristics. For example, the mobile terminal 200 may control LCD on/off, sound on/off, and flash on/off.

Referring to FIG. 16*a*, if the display 251 of the mobile terminal 200 is placed facing upward and the LCD is off, the mobile terminal 200 may switch the LCD on while transmitting its location information to the electronic device 100. The mobile terminal 200 may be equipped with a camera 221 on the front.

Referring to FIG. 16*b*, the electronic device 200 may be equipped with a rear camera 221', a speaker 252', and a flash 223.

The rear camera 221' preferably has high pixels because it does not generally transmit an object's image immediately after capturing it.

The flash 223 may be added near the rear camera 221'. The flash 223 illuminates an object when capturing it with the rear camera 221'.

Moreover, an audio output unit 252' may be additionally placed on the back of the rear case of the mobile terminal 200. The audio output unit 252' may implement a stereo function, together with a front audio output unit on the front of the mobile terminal 200, and also may be used to activate speakerphone mode during a call.

Referring to FIG. 16*b*, when the watch phone 100 receives a signal requesting location information from the watch phone 100 while interfacing with the mobile terminal 200, the flash 223 turns on if the mobile terminal 200 is placed facing downward so that the mobile terminal 200 can be easily located.

In this case, a predetermined audio signal may be output through the audio output unit 252'.

That is, if the user of the watch phone 100 wants to know the location of the mobile terminal 200 using the watch phone 100, they may detect the location of the mobile terminal 200 based on an image of the surroundings, location information, etc. transmitted from the mobile terminal 200, or may detect the location of the mobile terminal 200 indirectly by changing the output characteristics of the mobile terminal 200.

FIG. 17 is a flowchart of a method of controlling an electronic device according to a fourth exemplary embodiment of the present invention. FIGS. 18*a* and 18*b* are views for explaining the fourth exemplary embodiment of the present invention.

The method of controlling an electronic device according to the fourth exemplary embodiment of the present invention may be implemented in the electronic device 100 explained with reference to FIGS. 1 to 4. Hereinafter, the method of controlling an electronic device according to the fourth exemplary embodiment of the present invention and the operation of the electronic device 100 for implementing the same will be described with reference to the drawings as necessary. The fourth exemplary embodiment of the present invention to be described later may presuppose the foregoing first to third exemplary embodiments of the present invention.

Referring to FIG. 17, the mobile terminal 200 may acquire a first image by activating the camera and capturing the surroundings (S210). And, the electronic device 100 receives the first image and location information on the mobile terminal 200 (S401).

Upon receiving at least one of the location information and the first image from the mobile terminal 200, the controller 180 of the electronic device 100 activates the camera 121 of FIG. 1. Then, an image (second image) of the surroundings of the electronic device 100 may be captured with the camera 121 (S403).

That is, in the fourth exemplary embodiment of the present invention, when the watch phone 100 receives the image of the surroundings of the mobile terminal 200 from the mobile terminal 200, the watch phone 100 likewise may detect the current location of the mobile terminal 200 by capturing an image of the surroundings and determining the similarity between the two images.

The first image is an image captured by the mobile terminal 200, and the second image is an image captured by the watch phone 100.

The controller 180 determines the similarity between the first image and the second image (S405). The similarity between the first and second images may be determined according to whether at least one object included in the first image and at least one object included in the second image match or not.

For example, if the watch phone 100 and the mobile terminal 200 are in the same location, at least one object included in the first image and at least one object included in the second image may be identical. Even if they are not identical, the user can estimate the location of the mobile terminal 100 easily by seeing the two images.

If at least one object included in the first image and at least one object included in the second image are identical as a result of assessment of the similarity between the two images, detailed location information on the mobile terminal 200 may be displayed on the display 151 (S407).

That is, if the same object is present in each image, it can be seen that the mobile terminal 200 is positioned near the watch phone 100.

Referring to FIGS. 18a and 18b, the output characteristics of the mobile terminal 200 may be changed according to the similarity between the first image 20 captured by the mobile terminal 200 and the second image 31 captured by the watch phone 100 so that the mobile terminal 200 estimates the distance with the watch phone 100.

Referring to FIGS. 18a and 18b, assuming that the first image 20 and the second image 30 match 40% and 90%, it can be seen that the mobile terminal 200 and the watch phone 100 are farther away from each other when the two images match 40%, compared to when they match 90%. Accordingly, the volume of sound output from the audio output unit of the mobile terminal 200 may be higher when they match 40%, compared to when they match 90%.

The watch phone 100 and the mobile terminal 200 each may include a GPS module. Accordingly, images captured by the watch phone 100 and the mobile terminal 200 may be tagged with location information obtained when these images are captured. Therefore, the similarity between the two images can be determined based on the location information tagged to each of the first and second images.

For example, the similarity between the two images may be determined based on whether coordinate information tagged to each image is similar.

According to one exemplary embodiment of the present invention, when a predetermined event occurs to the mobile terminal 200 when there is a wireless link formed between the watch phone 100 and the mobile terminal 200, the status of the mobile terminal 200 may be periodically monitored using the watch phone 100 by transmitting status information on the mobile terminal 200 to the watch phone 100. This will be described in more detail with reference to FIG. 19.

FIG. 19 is a view for explaining an example of informing an electronic device with a watch phone of the status of an external mobile terminal.

Referring to FIG. 19, the watch phone 100 and the mobile terminal 200 may form a wireless link by using the foregoing methods explained with reference to the first to third exemplary embodiments of the present invention (S501).

Once the wireless link is formed, the mobile terminal 200 may transmit the above-mentioned status information to the watch phone 100 when the mobile terminal 200 has not been in use for a given period of time or longer, the signal strength for Bluetooth connection with the watch phone 100 is below a given level, a prescribed event occurs, or the battery is below a preset amount (S505).

The power of the mobile terminal 200 may be in the off state even though the watch phone has transmitted a signal requesting location information to the mobile terminal 200. The mobile terminal 200 may detect the reception of the control signal from the watch phone 100 by using standby power. As the control signal is received, the mobile terminal 200 may be kept powered on.

The foregoing exemplary embodiments have been described on the assumption that the watch phone 100 and the mobile terminal 200 are at a distance where they can be connected through short-range communication.

Needless to say, the exemplary embodiments of the present invention are also applicable when the watch phone 100 and the mobile terminal 200 are apart from each other by a critical distance for short-range communication.

For example, when the watch phone 10 fails in an attempt to establish a Bluetooth connection with the mobile terminal 200, or there is no AP shared between the watch phone 100 and the mobile terminal 200, the watch phone 100 and the mobile terminal 200 may perform data communication by a long-range communication method.

For example, the mobile terminal 200 may transmit location information on the mobile terminal 200 and information on an image captured form the surroundings to the watch phone 100 by a messaging means, such as SMS or MMS.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device having watch phone functionality, the electronic device comprising:
   a body;
   a band connected to the body to be wearable on a user;
   a wireless communication unit;
   a display to receive an input;
   a sensing unit positioned at a boundary of the display;
   a controller configured to:
     recognize touch input having a predetermined touch pattern along a perimeter of the boundary of the display, wherein the predetermined touch pattern is a drag input along the perimeter of the boundary of the display,
     transmit, in response to receiving the touch input on the display, a control signal to a mobile terminal through the wireless communication unit in order to create a wireless link with the mobile terminal, wherein the control signal activates a camera on the mobile terminal, and
     receive a first image captured by the camera of the mobile terminal and location infotination of the mobile terminal,
   wherein the controller is further configured to:
     display a predetermined indicator in a region of the display in response to receiving, from the mobile terminal, location information of the mobile terminal, wherein the predetermined indicator and the region of the display indicate a direction that the mobile terminal is located relative to the electronic device, and
     display the first image on the display in response to a drag input for moving the indicator to a center region of the display.

2. The electronic device of claim 1, wherein the sensing unit is sensing the user's touch input while the display is in an off state.

3. The electronic device of claim 1, wherein the predetermined touch pattern includes at least one of:
   a drag input based on a multi-touch,
   a touch input on the boundary of the display that lasts for a predetermined period of time, and
   no touch input for a predetermined period of time after the touch input on the boundary of the display.

4. The electronic device of claim 1, wherein the controller is configured to periodically receive, through the wireless communication unit, location information of the mobile terminal, and
   in response to receiving the predetermined pattern of touch inputs, the controller to automatically transmit the control signal to the mobile terminal when the electronic device is separated away from the mobile terminal by at least a predetermined distance.

5. The electronic device of claim 1, wherein the control signal includes at least one of:
   a signal to obtain surroundings of the mobile terminal, and
   a signal to request the location information of the mobile terminal and an image of the surroundings of the mobile terminal.

6. The electronic device of claim 1, further comprising the camera,
   wherein, in response to receiving the first image from the mobile terminal, the controller is configured to activate the camera and capture surroundings of the electronic device.

7. The electronic device of claim 6, wherein the controller is configured to determine a similarity between the first image and a second image obtained by the electronic device by comparing the first image with the second image,
   wherein the similarity is determined based on whether at least one object included in the first image and at least one object included in the second image match or do not match, or
   wherein the similarity is determined based on the location information tagged on each of the first image and the second image.

8. The electronic device of claim 1, wherein the controller is configured to transmit the control signal to the mobile terminal in response to receiving a touch input on at least one content displayed on the display.

9. The electronic device of claim 8, wherein the control signal includes a signal to display the content on the display of the mobile terminal.

10. The electronic device of claim 1, wherein the controller is configured to receive location information from the mobile terminal and transmit a signal for outputting an audio signal through the mobile terminal or a predetermined message to the mobile terminal based on the location information.

11. A method of controlling an electronic device having watch phone functionality, the electronic device having a body and a band connected to the body to be wearable on a user, the method comprising:
   recognizing a touch input, via a sensing input positioned at a boundary of a display of the electronic device, the touch input having a predetermined touch pattern along a perimeter of the boundary of the display, wherein the predetermined touch pattern is a drag input along the perimeter of the boundary of the display;
   transmitting, in response to the touch input, a control signal to a mobile terminal to create a wireless link with the mobile terminal, wherein the control signal activates a camera on the mobile terminal;
   receiving a first image captured by the camera of the mobile terminal and location information of the mobile teiminal:
   displaying a predeteimined indicator in a region of the display in response to receiving, from the mobile terminal, location information of the mobile terminal, wherein the predetermined indicator and the region of the display indicate a direction that the mobile terminal is located relative to the electronic device; and
   displaying the first image on the display in response to a drag input for moving the predetermined indicator to a center region of the display.

12. The method of claim 11, wherein transmitting the control signal to the mobile terminal includes:

periodically receiving, through a wireless communication unit, the location information of the mobile terminal; and in response to receiving the predetermined pattern of touch inputs, automatically transmitting the control signal to the mobile terminal when the electronic device is separated away from the mobile terminal by at least a predetermined distance.

13. The method of claim 11, wherein the control signal includes at least one of a signal to obtain surroundings of the mobile terminal and a signal to request the location information of the mobile terminal.

14. The method of claim 13, further comprising displaying a predetermined indicator in a region of the display in response to receiving the location information of the mobile terminal, in order to determine a direction that the mobile terminal is located relative to the electronic device.

15. The method of claim 13, further comprising:
in response to receiving the first image, activating a camera at the electronic device;
obtaining a second image of surroundings of the electronic device with the camera; and
determining a similarity between the first image and the second image,
wherein the similarity is determined based on whether at least one object included in the first image and at least one object included in the second image match or do not match, or
wherein the similarity is determined based on the location information tagged on each of the first image and the second image.

* * * * *